Figure 1:
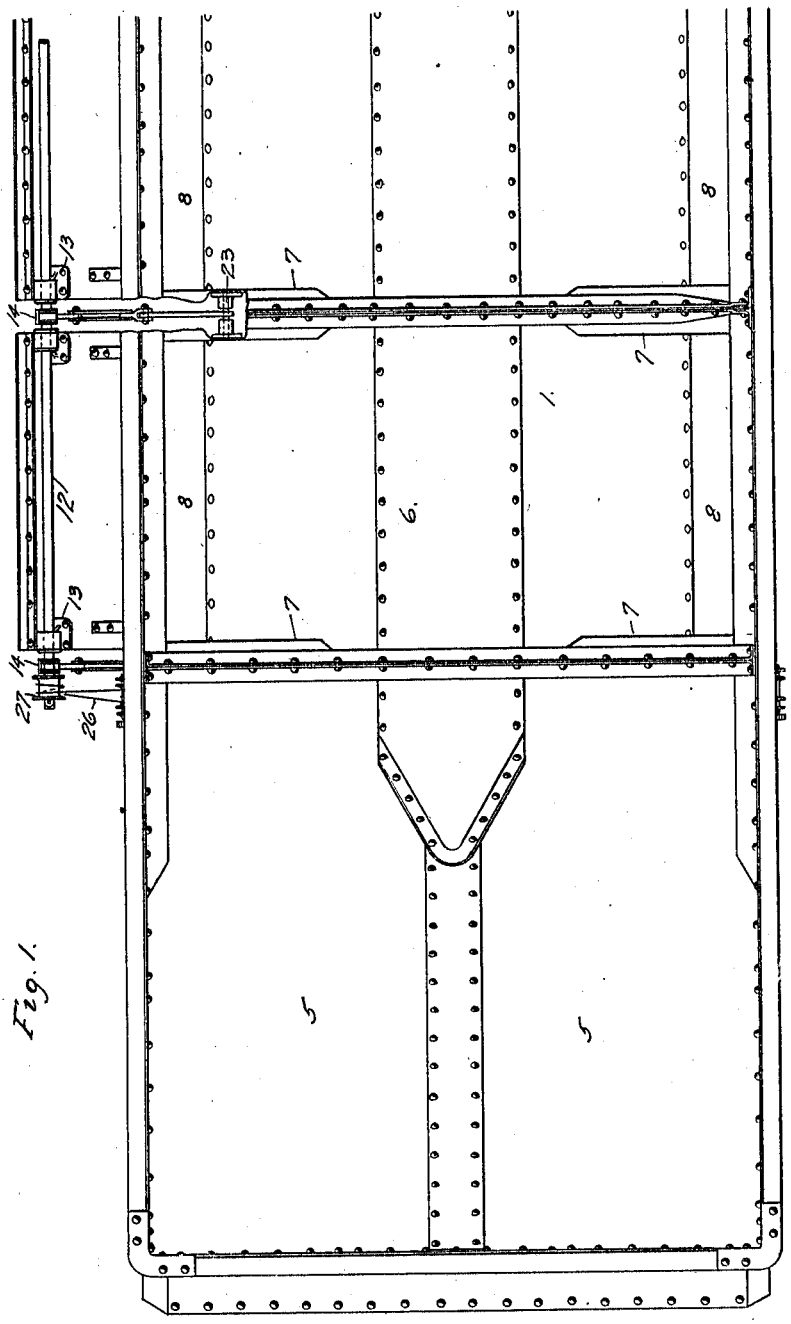

A. CAMPBELL.
DUMP CAR.
APPLICATION FILED MAR. 11, 1910.

974,470.

Patented Nov. 1, 1910.

5 SHEETS—SHEET 1.

WITNESSES:
H. M. Munday
Pearl Abrams.

INVENTOR
Argyle Campbell
BY
Munday, Evarts, Adcock & Clarke.
ATTORNEYS

A. CAMPBELL.
DUMP CAR.
APPLICATION FILED MAR. 11, 1910.
974,470.
Patented Nov. 1, 1910
5 SHEETS—SHEET 2.
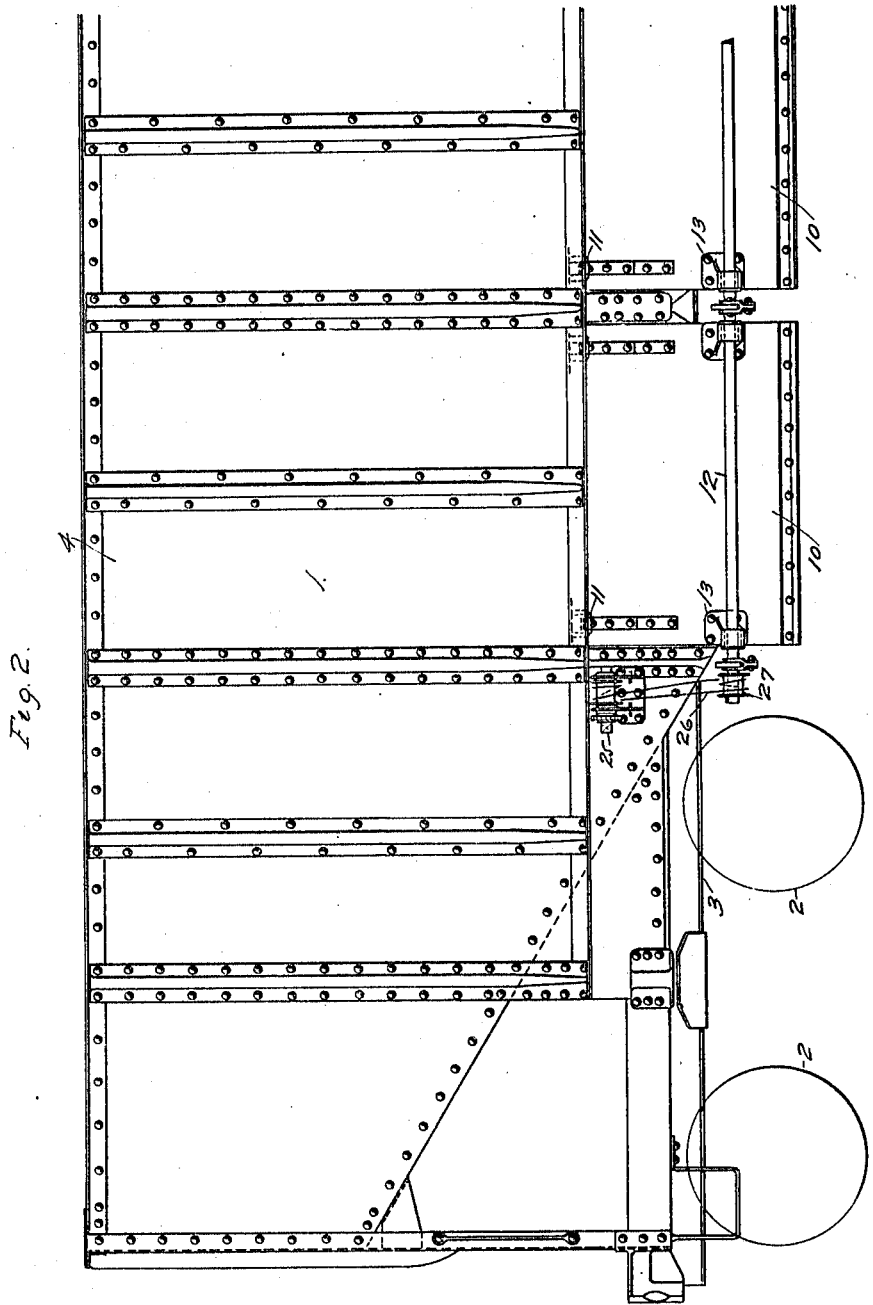
WITNESSES:
INVENTOR
Argyle Campbell
BY
Munday, Evarts, Adcock & Clarke.
ATTORNEYS

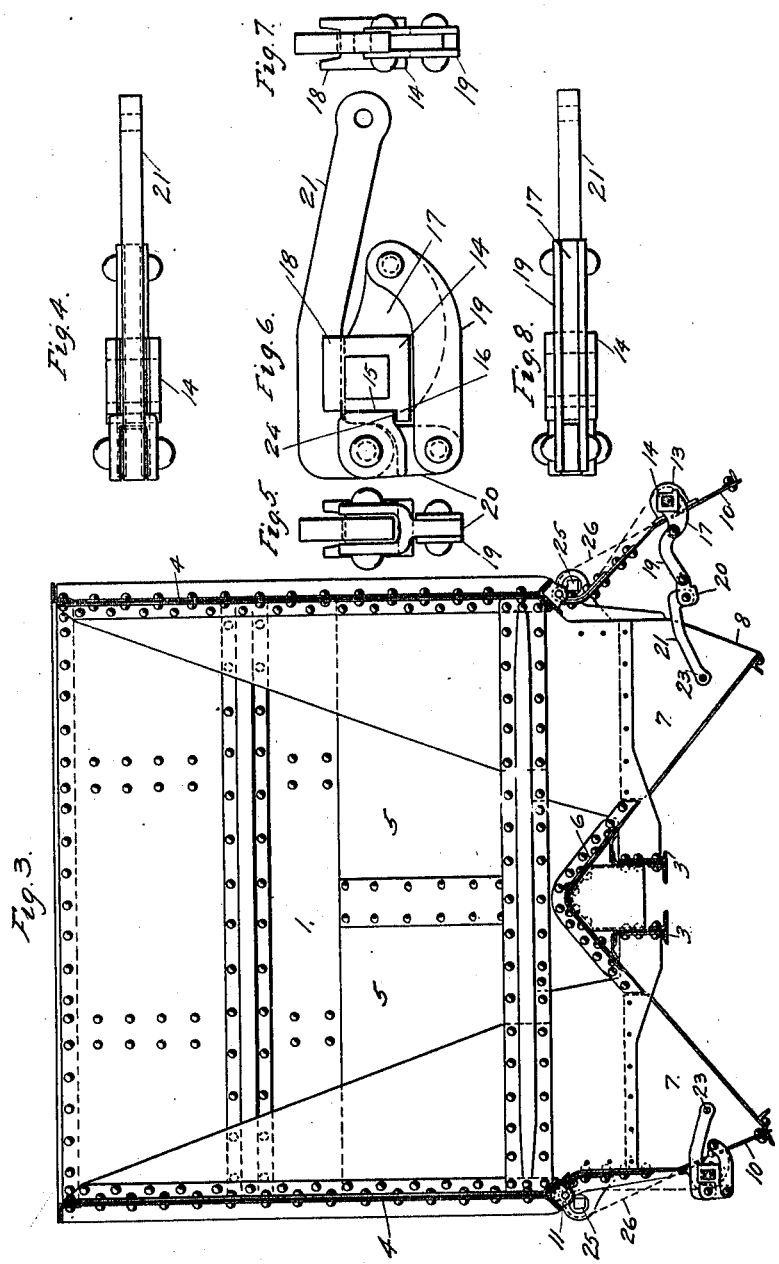

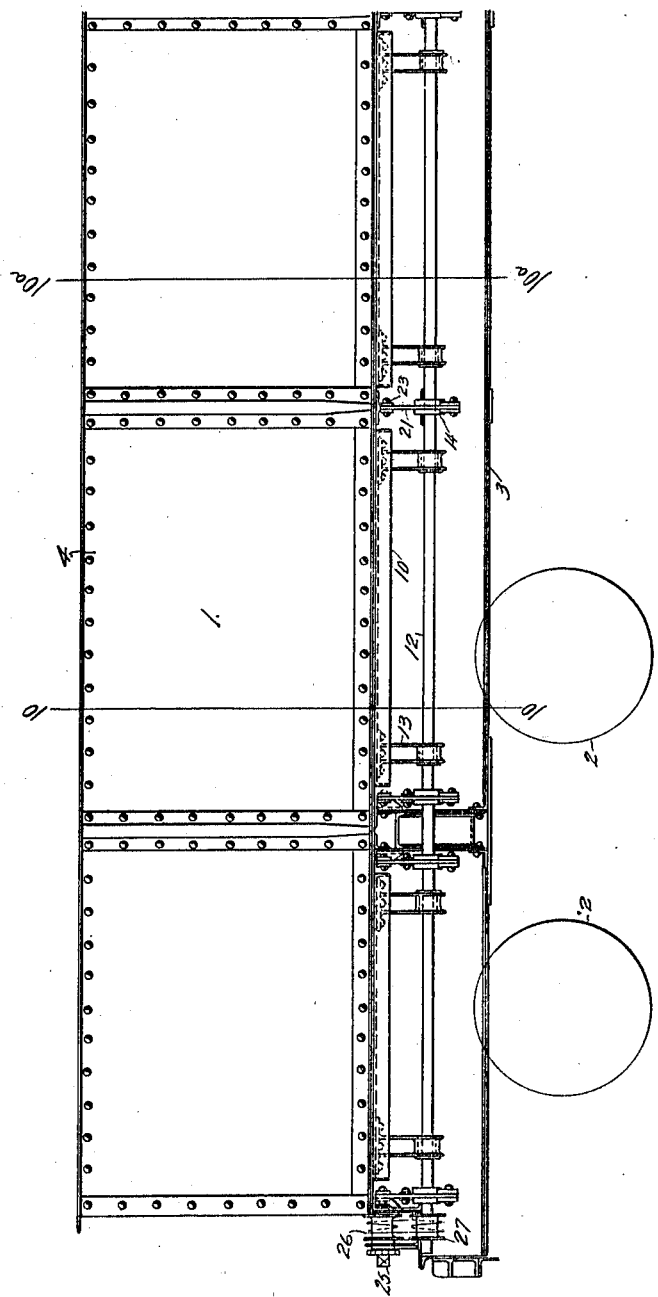

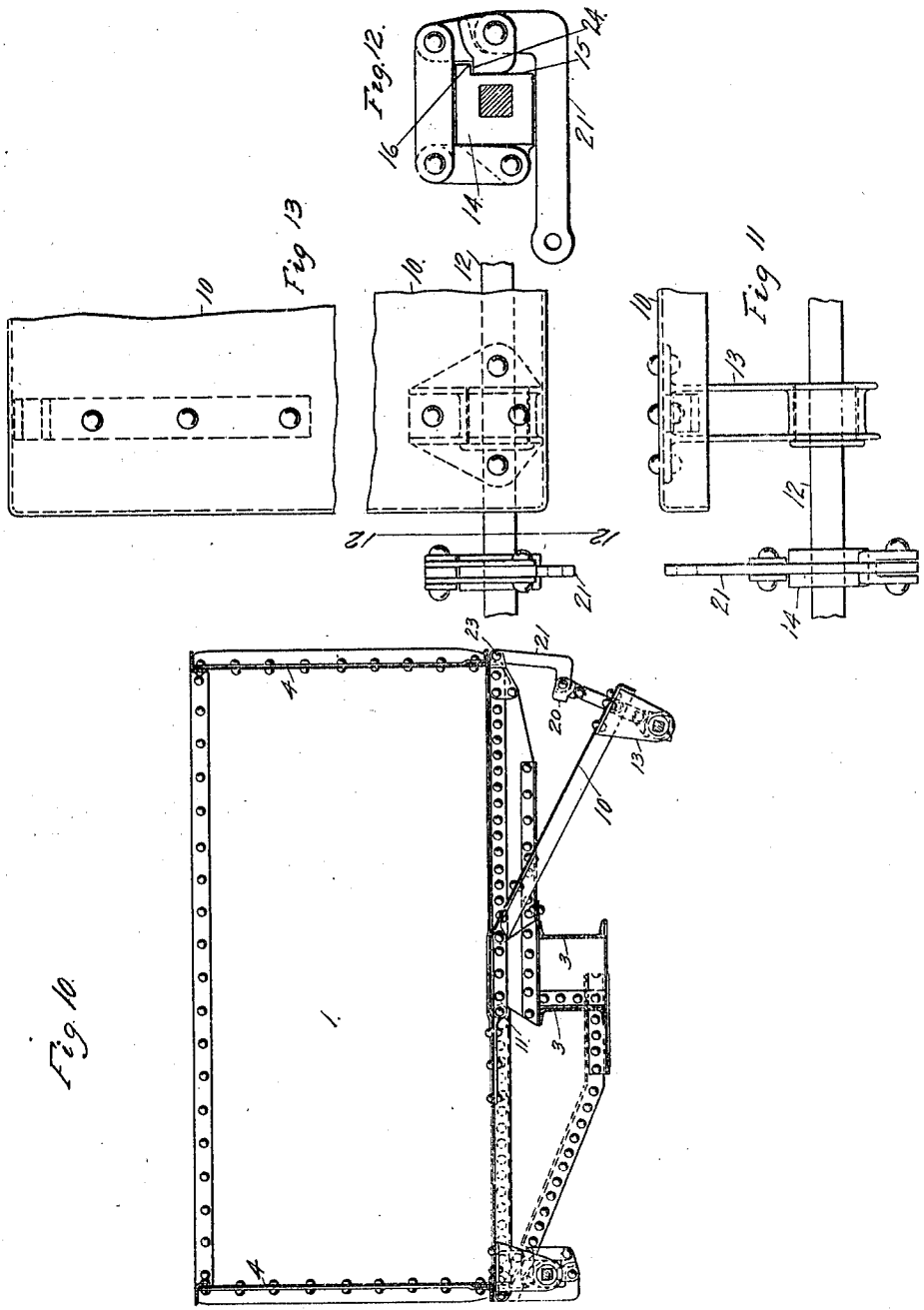

UNITED STATES PATENT OFFICE.

ARGYLE CAMPBELL, OF CHICAGO, ILLINOIS, ASSIGNOR TO ENTERPRISE RAILWAY EQUIPMENT COMPANY, OF CHICAGO, ILLINOIS, A CORPORATION OF ILLINOIS.

DUMP-CAR.

974,470.     Specification of Letters Patent.     Patented Nov. 1, 1910.

Application filed March 11, 1910. Serial No. 548,517.

*To all whom it may concern:*

Be it known that I, ARGYLE CAMPBELL, a citizen of the United States, residing in Chicago, in the county of Cook and State of Illinois, have invented a new and useful Improvement in Dump-Cars, of which the following is a specification.

My invention relates to improvements in dump cars.

The object of my invention is to provide a side dump hopper car with movable operating shafts journaled in suitable bearings upon the side dump doors, and which will be of a strong, simple, efficient and durable construction, composed of few parts and capable of being easily and conveniently operated.

My invention consists in the means I employ to practically accomplish this object or result as herein shown and described and more particularly specified in the claims.

In the accompanying drawing forming a part of this specification, Figure 1 is a plan view showing one-half or end of a dump car embodying my invention. Fig. 2 is a side elevation. Fig. 3 is a vertical cross section. Figs. 4, 5, 6, 7 and 8 are detail views of the door operating mechanism. Fig. 9 is a side elevation, illustrating as a modification the application of my invention to a flat bottom gondola car. Fig. 10 is a cross section on line 10—10 and 10ª—10ª of Fig. 9 and Fig. 11 is a detail elevation showing a portion of the door and the operating shaft thereon. Fig. 12 is a cross section on line 12—12 of Fig. 13 and Fig. 13 is a detail plan view, of the mechanism shown in Fig. 11.

In the drawing, 1 represents a dump car, 2 the wheels thereof, 3 the center sills, 4 the upright sides of the car body, 5 the floor or bottom, the same being preferably inclined or hopper shaped at the ends, 6 the longitudinal central hopper sheet extending over the center sills, 7 transverse hopper sheets extending across the car between the door openings 8, on each side of the central hopper sheet and 10 are longitudinally hinged doors closing the door openings on each side of the central hopper sheet and between the several side transverse hopper sheets. The several side dump doors 10 on each side of the longitudinal hopper sheet are hinged at their upper outer edges to the upright sides of the car body by hinges 11. And the several doors 10 on each side of the central hopper sheet are connected together by a common movable operating shaft 12, journaled in suitable bearings 13, attached to the doors 10 near their lower or free edges. Each of the movable operating shafts 12 is furnished with a plurality of polygonal drums 14, each preferably four sided and having a locking face or side 15 furnished with a shoulder or projection 16. Each of the drums 14 also has a pivot lug 17 and guides or flanges 18 on the side thereof opposite the pivot lug. A plurality of links 19, 20, 21, preferably three in number, connect the drum of the operating shaft with the transverse hopper sheet 7 at 23. One of the connecting links, preferably the middle one, 20, has on its inner face a locking shoulder 24 adapted to interlock with and engage the locking shoulder on the face of the drum. The movable door operating shaft 12 is connected with and operated from the fixed winding shaft 25 journaled on the car body by a winding chain 26 which engages a chain winding drum 27 on the operating shaft 12.

In the modification shown in Figs. 9 to 13, the construction is the same with the exception that the invention is illustrated as being applied to a gondola or flat bottom car, instead of to a hopper bottom car.

I claim:—

1. In a dump car, the combination with a car body having a plurality of door openings on each side of its longitudinal center, a plurality of side dump doors hinged to the car body, a movable operating shaft journaled in bearings fixed to the doors near their free edges, said operating shaft connecting two adjacent doors, a polygonal winding drum on said shaft having a shouldered locking face, flexible connecting links between said winding drum and the car body, one of said connecting links having a shouldered locking face, substantially as specified.

2. In a dump car, the combination with a car body having a plurality of door openings on each side of its longitudinal center, a plurality of side dump doors hinged to the car body, a movable operating shaft journaled in bearings fixed to the doors near their free edges, said operating shaft connecting two adjacent doors, a polygonal winding drum on said shaft having a shouldered locking face, flexible connecting links between said winding drum and the car body, one of said connecting links having a shouldered locking face, a winding shaft journaled on the car body and a winding chain and drums connecting said winding shaft on the doors, substantially as specified.

3. In a dump car, the combination with a car body, of a hinged door, an operating shaft journaled on and movable with the door, a polygonal winding drum on said shaft having a shouldered locking face, and flexible connecting links between said winding drum and the car body, one of said links having a shouldered locking face engaging the shouldered locking face of said drum, substantially as specified.

4. In a dump car, the combination with a car body, of hinged doors, an operating shaft journaled on, movable with and connecting said doors, a polygonal winding drum on said shaft having a shouldered locking face, and flexible connecting links between said winding drum and the car body, one of said links having a shouldered locking face engaging the shouldered locking face of said drum, substantially as specified.

5. In a dump car, the combination with a car body, of a hinged door, an operating shaft journaled on and movable with the door, a polygonal winding drum on said shaft having a shouldered locking face, and flexible connecting links between said winding drum and the car body, one of said links having a shouldered locking face engaging the shouldered locking face of said drum, a further shaft journaled in fixed bearings on the car body, and connecting means between said further shaft and said operating shaft on the door, substantially as specified.

6. In a dump car, the combination with a car body, of hinged doors, an operating shaft journaled on, movable with and connecting said doors, a polygonal winding drum on said shaft having a shouldered locking face, and flexible connecting links between said winding drum and the car body, one of said links having a shouldered locking face engaging the shouldered locking face of said drum, a further shaft journaled in fixed bearings on the car body, and connecting means between said further shaft and said operating shaft on the doors, substantially as specified.

7. In a car of the class described, the combination with a car body and hinged doors, of a movable operating shaft journaled on and movable with the doors and provided with winding drums, flexible connecting links between the winding drums and car body, a revolving shaft journaled in stationary brackets on the car body, and flexible connections between said shafts on the car body and on the doors, substantially as specified.

8. In a car of the class described, the combination with a car body and hinged doors, of a movable operating shaft journaled on and movable with the doors and provided with winding drums, flexible connecting links between the winding drums and car body, a revolving shaft journaled in stationary brackets on the car body, and flexible connections between said shafts on the car body and on the doors, said movable operating shaft on the doors forming a lock when closed and resting in a movable hook or pocket of a connecting link, substantially as specified.

9. The combination with a car body, of a hinged door, a movable rotating operating shaft journaled in bearings on the door and having a winding drum, a swinging hook link pivotally connected to the car body, flexible connections between said swinging hook link and the winding drum on said movable rotating shaft and means for rotating said shaft whereby said shaft shall at the termination of its swinging movement rest in said swinging hook link and lock the car door when in closed position, substantially as specified.

10. In a dump car, the combination with a car body having a plurality of door openings on each side of its longitudinal center, a plurality of side dump doors hinged to the car body, a movable operating shaft journaled in bearings fixed to the doors near their free edges, said operating shaft connecting two adjacent doors, winding drums on said shaft and flexible connecting links between said winding drums and the car body, substantially as specified.

11. In a dump car, the combination with a car body, of a hinged door, an operating shaft journaled on and movable with the door, flexible connecting links between said operating shaft and the car body, the terminal link being pivotally connected to the car body and being of a hook form to form a pocket to receive said movable operating shaft, a further shaft journaled in fixed bearings on said car body and connecting means between said further shaft and said movable operating shaft on the door whereby said operating shaft shall at the termination of its swinging movement with the door rest in said movable hook shaped link and lock the door in its closed position, substantially as specified.

ARGYLE CAMPBELL.

Witnesses:
EDMUND ADCOCK,
H. M. MUNDAY.